(12) United States Patent
Siu et al.

(10) Patent No.: US 12,144,464 B2
(45) Date of Patent: Nov. 19, 2024

(54) SAFETY SYSTEM, A METHOD FOR SELECTING AN OPERATING MODE, AND A LID FOR A KITCHEN DEVICE

(71) Applicant: BREVILLE PTY LIMITED, Alexandria (AU)

(72) Inventors: Eddie Siu, Alexandria (AU); Khon Thai, Alexandria (AU); Lochana Subasekara Widanagamage Don, Alexandria (AU); Bin Geng, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 657 days.

(21) Appl. No.: 17/256,975

(22) PCT Filed: Jun. 27, 2019

(86) PCT No.: PCT/AU2019/050673
§ 371 (c)(1),
(2) Date: Dec. 29, 2020

(87) PCT Pub. No.: WO2020/000046
PCT Pub. Date: Jan. 2, 2020

(65) Prior Publication Data
US 2021/0177212 A1 Jun. 17, 2021

(30) Foreign Application Priority Data
Jun. 29, 2018 (AU) .................................. 2018902373

(51) Int. Cl.
*A47J 43/07* (2006.01)
(52) U.S. Cl.
CPC ....... *A47J 43/0777* (2013.01); *A47J 43/0716* (2013.01)

(58) Field of Classification Search
CPC .................................................... A47J 43/0777
(Continued)

(56) References Cited

U.S. PATENT DOCUMENTS

| 4,510,777 A | 4/1985 | Ellingson |
| 5,567,049 A * | 10/1996 | Beaudet .............. A47J 43/0777 241/37.5 |

(Continued)

FOREIGN PATENT DOCUMENTS

| CN | 105167657 A | 12/2015 |
| EP | 0571348 B1 | 11/1993 |

(Continued)

OTHER PUBLICATIONS

International Search Report for Application No. PCT/AU2019/050673, mailing date Oct. 10, 2019.

(Continued)

*Primary Examiner* — David L Sorkin
(74) *Attorney, Agent, or Firm* — Tarolli, Sundheim, Covell & Tummino LLP

(57) ABSTRACT

A safety system (4) for a kitchen device (1) having a vessel (5) and a lid (21), the safety system (4) comprising: a processor (10); a retaining arm (7) adapted to, in a retaining position, retain the lid (21) against the vessel (5); a first sensor (40) adapted to communicate a retaining signal to the processor (10) when the retaining arm (7) is in the retaining position; and a second sensor (43) adapted to communicate a function signal to the processor (10), the function signal indicating a function of the lid (21), wherein the processor (10) is adapted to select an operating mode of the kitchen device (1) in response to the retaining signal and the function signal.

5 Claims, 19 Drawing Sheets

(58) Field of Classification Search
USPC .......................... 366/205, 206, 314; 241/37.5
See application file for complete search history.

(56) References Cited

U.S. PATENT DOCUMENTS

| | | | |
|---|---|---|---|
| 2012/0206995 A1* | 8/2012 | Wu ........................... | F16P 3/08 |
| | | | 366/205 |
| 2015/0037480 A1 | 2/2015 | Carlson | |
| 2017/0303744 A1 | 10/2017 | Sutton et al. | |
| 2018/0078094 A1* | 3/2018 | Haney ................. | A47J 43/0761 |

FOREIGN PATENT DOCUMENTS

| | | |
|---|---|---|
| RU | 2355281 C2 | 12/2004 |
| WO | 2008031709 A1 | 3/2008 |
| WO | WO 2011/113083 A1 | 9/2011 |

OTHER PUBLICATIONS

Office Action issued in connection with corresponding Russian application No. 2020142205/(078411) dated Jun. 27, 2019.
European Search Report for EP 19825206.6 dated Mar. 1, 2022.
CN Office Action for corresponding CN Application No. 201980040398.2, dated Sep. 26, 2023, pp. 1-12.

\* cited by examiner

SAFETY SYSTEM, A METHOD FOR SELECTING AN OPERATING MODE, AND A LID FOR A KITCHEN DEVICE

FIELD

This invention relates to a safety system for a kitchen device, a method for selecting an operating mode of a kitchen device, and a lid for a kitchen device.

BACKGROUND

Kitchen devices performing a variety of stirring, processing, blending and/or heating of ingredients have recently become popular in the consumer and commercial markets. These devices may be referred to as multicookers. A problem that has emanated from the increasing popularity of such multicookers is that stirring and/or blending heated substances such that they have large amounts of kinetic energy can present a substantial risk to users operating the device. Therefore, safety systems have been integrated into devices performing kinetic operations such as stirring or blending on heated ingredients to decrease the risk of users being exposed to and/or injured by the heated ingredients.

However, presently known safety systems are primarily designed to maintain a closed volume in a vessel used by the kitchen device by securing a lid to the vessel, and ensuring that the lid remains secured to the vessel while the ingredients have significant kinetic energy. A substantial disadvantage of this arrangement is that a common task in preparing meals, the reduction of a combination of ingredients including water by heating the combination such that water evaporates and escapes, is either not possible, or restricted by limited escape paths being available to the steam.

Further, it is presently not possible for the kitchen device to select a mode of operation, and apply safety limits to a motor and in the kitchen device providing the stirring, processing, and/or blending functionality depending on the intended and possible use of the kitchen device.

Finally, present kitchen devices having blending and heating functionality are not able to reduce ingredients by evaporation, as the safety standards require an access restriction to the moving blade of the kitchen device.

SUMMARY OF INVENTION

It is an object of the present invention to at least substantially address the above discussed disadvantages, or at least provide a useful alternative to the above arrangements.

In a first aspect, the present invention provides a safety system for a kitchen device having a vessel and a lid, the safety system comprising:
a processor;
a retaining arm adapted to, in a retaining position, retain the lid against the vessel;
a first sensor adapted to communicate a retaining signal to the processor when the retaining arm is in the retaining position; and
a second sensor adapted to communicate a function signal to the processor, the function signal indicating a function of the lid,
wherein the processor is adapted to select an operating mode of the kitchen device in response to the retaining signal and the function signal.

Preferably, the operating mode includes a limitation on a speed of a motor of the kitchen device.

Preferably, the limitation on the speed of the motor is effected by a safety relay disconnecting a power delivery circuit to the motor when a maximum speed is measured by a motor speed sensor.

Preferably, the retaining arm is movable between a free position and the retaining position.

Preferably, the safety system further comprises:
a securing hook, the securing hook being movable between a free position and a securing position, wherein, in the securing position, the securing hook secures the retaining arm in a secured retaining position, and wherein a third sensor is adapted to communicate a securing signal when the securing hook is in the securing position.

Preferably, there are at least two second sensors and the retaining arm is adapted to contact the lid on at least two separate contact areas, each contact area having at least one second sensor.

Preferably, the function comprises an indication of the type of lid present on the vessel and the type of lid is determined by the processor by determining which, if any, of the second sensors communicate a function signal.

In a second, aspect the present invention provides a lid to be used with the safety system according to the first aspect, wherein the lid has a surface geometry adapted to cause the second sensor to communicate the function signal to the processor.

Preferably, the surface geometry includes one or more protrusions adapted to interact with the second sensor.

In a third aspect the present invention provides a method for selecting an operating mode of a kitchen device, the method comprising the steps of:
placing a lid on a vessel of the device;
operating a retaining arm of the device, the retaining arm being adapted to retain the lid in position on the vessel;
determining a position of the retaining arm using a first sensor;
determining a function of the lid using a second sensor;
communicating the position of the retaining arm and the function of the lid to a processor; and
the processor selecting an operating mode on the basis of the position of the retaining arm and the function of the lid.

Preferably, the retaining arm is movable between a free position and a retaining position, and wherein the method further comprises the steps of:
determining, when the retaining arm is in an unlocked position, whether the second sensor senses a presence of the lid on the vessel; and subsequently
when the processor receives an indication that the second sensor senses the presence of the lid on the vessel, the processor prevents use of the kitchen device and outputs an error signal.

Preferably, the error signal is a prompt to clean the second sensor.

Preferably, the method further comprises the steps of:
operating a power switch of the device;
determining whether the retaining arm is in the retaining position; and
if the retaining arm is in the retaining position, the processor outputs a prompt to move the retaining arm to the free position.

Preferably, the method further comprises the steps of:
operating a securing hook from a free position to a securing position to secure the retaining arm in a secured retaining position;
a third sensor communicating the position of the securing hook to the processor; and the processor supplying power to the motor when the processor receives an indication from the third sensor that the securing hook is in the securing position.

Preferably, the method further comprises the step of:

the processor preventing use of the kitchen device and outputting an error signal, if the processor has not received an indication that the securing hook is in the securing position within 4 seconds of operating the securing hook.

Preferably, the operating mode includes a limitation on a speed of a motor of the kitchen device.

Preferably, the method further comprises the step of:

measuring the speed of the motor using a motor speed sensor; and limiting the speed of the motor by a power delivery circuit being disconnected by a safety relay when the speed of the motor is above a predetermined maximum motor speed.

Preferably, there are at least two second sensors and the retaining arm is adapted to contact the lid on at least two separate contact areas, each contact area having at least one second sensor.

Preferably, the function comprises an indication of the type of lid present on the vessel and the type of lid is determined by the processor by determining which, if any, of the second sensors communicate a function signal.

In a fourth aspect, the present invention provides a lid for a vessel used with a kitchen device, the vessel including a floor and upwardly extending sidewalls ending at a rim surrounding an opening to a space within the vessel, the lid including:

a central hub;

a rim; and a structure extending between the central hub and the rim, the structure including one or more first apertures such that an unobstructed space of the structure is at least 20% of the opening and a continuous rectangular portion of the unobstructed space does not exceed 78 mm×25.4 mm.

Preferably, the structure further includes:

an intermediate member separating one or more second apertures from the one or more first apertures;

one or more outer connectors connecting the intermediate member to the rim to support the intermediate member, thereby forming the one or more first apertures; and one or more inner connectors connecting the intermediate member to the central hub to support the central hub, thereby forming the one or more second apertures.

Preferably, the one or more outer connectors are equally spaced such that the unobstructed space extends adjacent the rim continuously for at least 100° for allowing access of a scraper through the lid to the upwardly extending sidewalls.

Preferably, the one or more outer connectors are located at a single location such that the unobstructed space extends adjacent the rim continuously for at least 350°.

Preferably, the central hub extends a first distance radially from a center point of the lid;

the intermediate member is located at a second distance radially from the center point; and the rim is located at a third distance radially from the center point, wherein the difference between the first distance and the second distance is approximately 65 mm, and wherein the difference between the second distance and the third distance is approximately 50 mm.

Preferably, the unobstructed space of the structure is at least 80% of the opening.

In a fifth aspect, the present invention provides a lid for a vessel used with a kitchen device, the vessel including a floor and upwardly extending sidewalls ending at a rim surrounding an opening to a space within the vessel, the lid including:

a central hub;

a rim; and a structure extending between the central hub and the rim, the structure including one or more first apertures such that an unobstructed space of the structure extends adjacent the rim continuously for at least 100° for allowing access of a scraper through the lid to the upwardly extending sidewalls.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
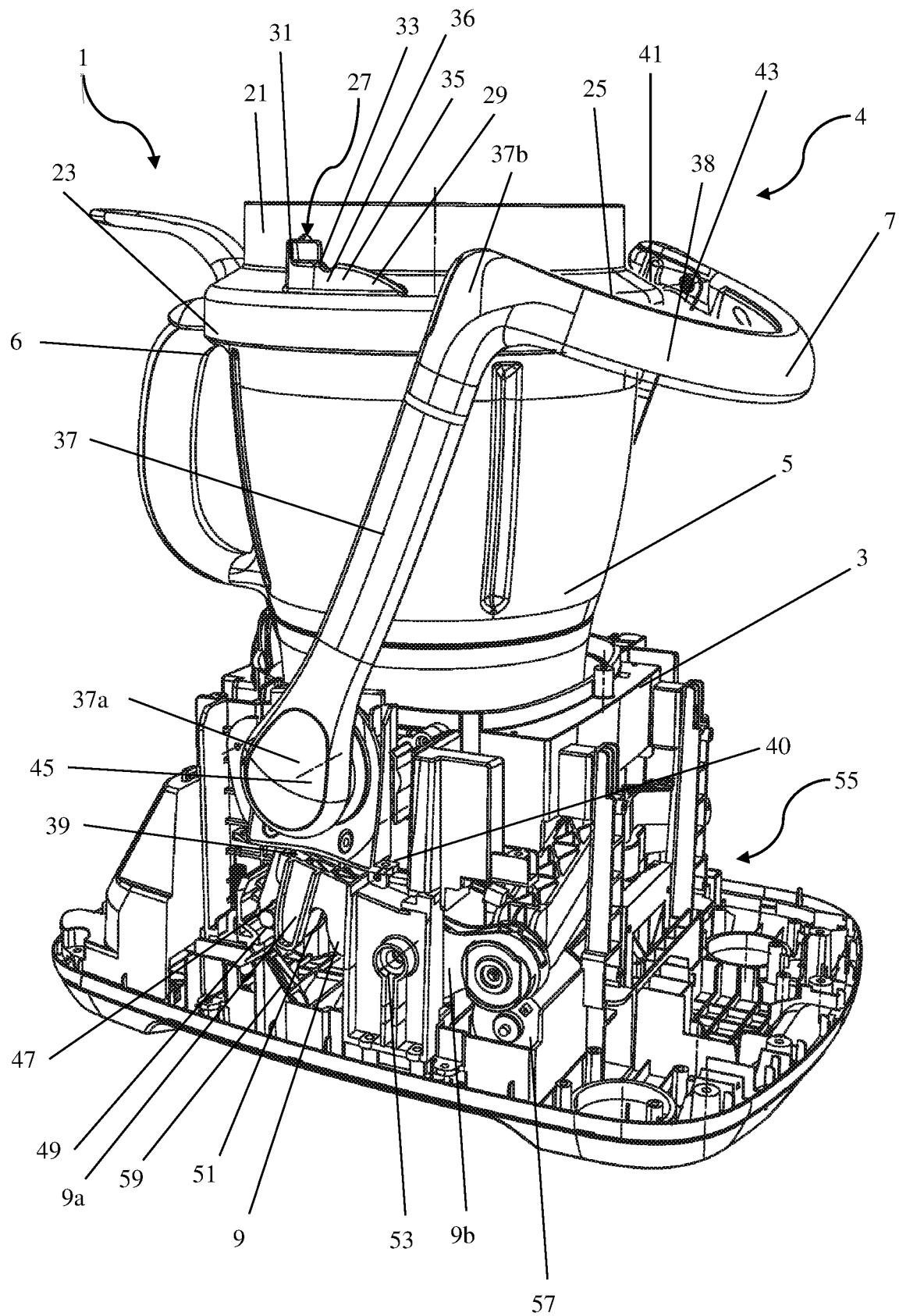
FIG. 1 is a perspective cut-away view of a kitchen device employing an embodiment of the safety system according to the invention.
Figure 2:
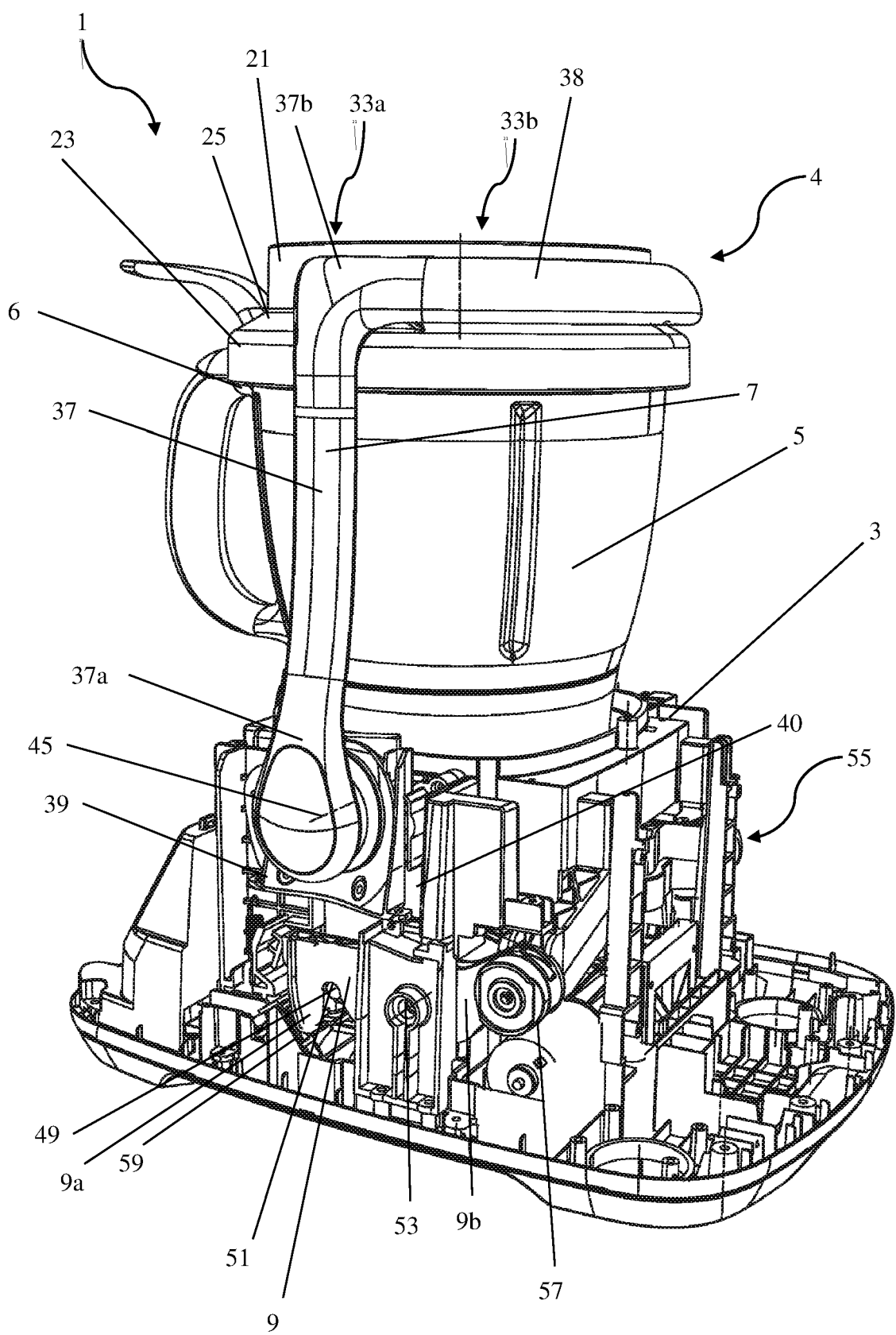
FIG. 2 is a perspective cut-away view of the kitchen device of FIG. 1 with a retaining arm in the retaining position.
Figure 9:
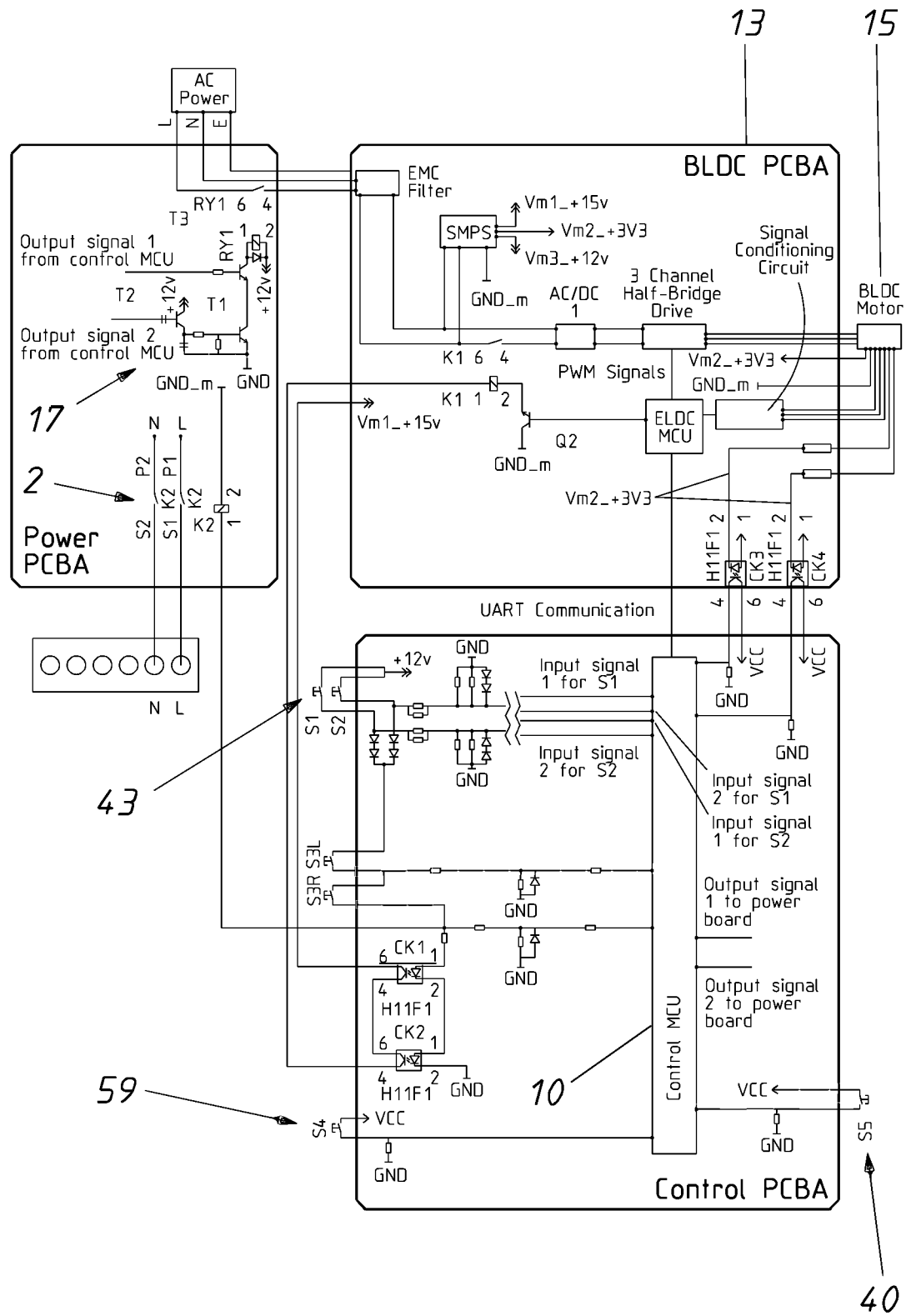
FIG. 9 is a schematic block circuit diagram of the safety system of FIG. 8.

A kitchen device 1, such as the kitchen device 1 shown in FIG. 1, may include a safety system 4 according to the present invention. As shown in FIG. 1, the kitchen device 1 typically has a body 3 and a vessel 5, having a rim 6, mounted thereon. As shown in FIG. 9, the kitchen device 1 also has a power switch 2. A lid 21 is also provided and, in use, placed on the vessel 5. The lid 21 has a rim 23 extending beyond the rim 6 of the vessel 5, and an upper surface 25. On the upper surface 25 there are located two projections 27. The projections 27 have a rounded leading edge 29 and an upright stop edge 31. Extending from the upright stop edge may be a contact edge 33. A guiding edge 35 extends between the leading edge 29 and the stop edge 31. The guiding edge 33 has a notch 36. The guiding edges 33 are adapted to guide the retaining arm 7 into a correct alignment with the contact edges 33 as shown in FIG. 2. The notch 36 provides tactile feedback to the user that the retaining arm 7 is in the correct alignment.

The safety system 4 includes a retaining arm 7 and a securing hook 9. The retaining arm 7 has a pair of longitudinally extending members 37. The members 37 are, at a first end 37a, attached to the body 3 using a hinge 39. At a second end 37b, the members 37 are joined by a perpendicularly extending rounded member 38. The retaining arm 7 also has a channel 41 located at each second end 37b of the members 37. A lid detection switch 43 is located in each channel 41.

Figure 3:
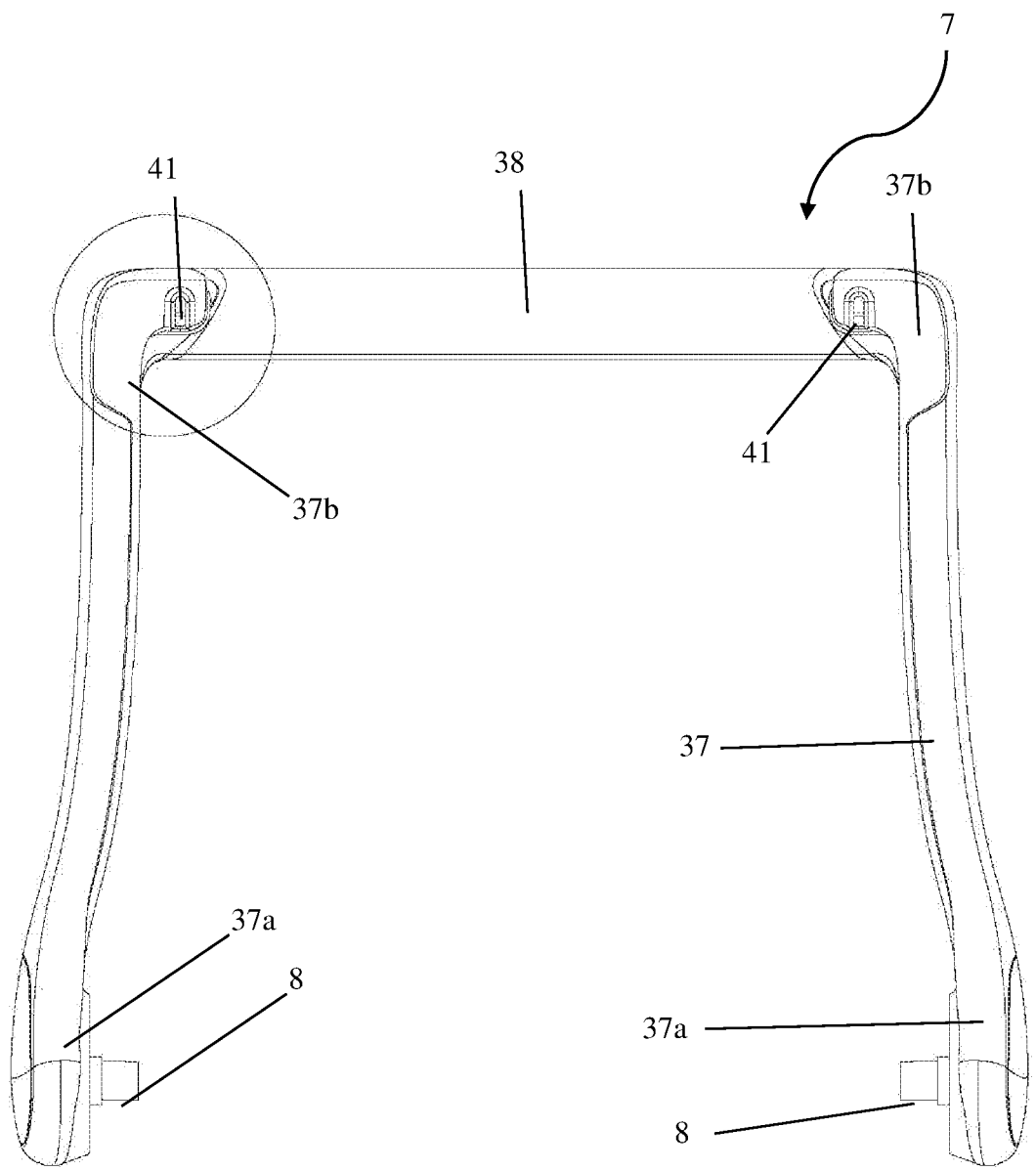
FIG. 3 is a front section view of the retaining arm of the kitchen device of FIG. 1.
Figure 4:
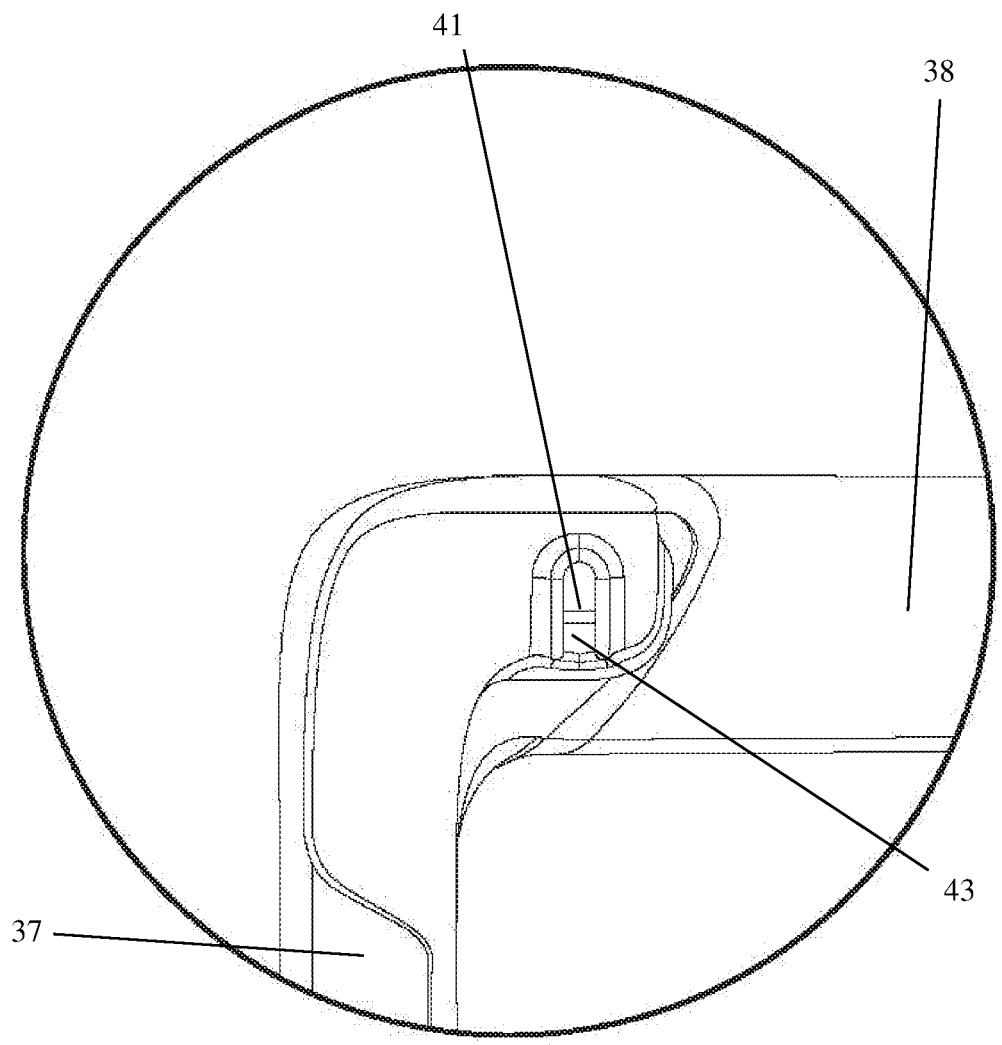
FIG. 4 is a detailed front section view of the retaining arm of the kitchen device of FIG. 1.

As shown in FIG. 3, the retaining arm 7 has a rotating projection 8 located at each first end 37a of the members 37. The rotating projections 8 engage with the hinge 39 to allow pivoting of the retaining arm 7 with respect to the body 3 about a hinge axis 45. Also, as shown in FIGS. 3 and 4, the channels 41 are substantially vertical slots with a rounded end point The retaining arm 7 pivots between a free position, as shown in FIG. 1, and a retaining position, as shown in FIG. 2. The channels 41 are adapted to receive the contact edges 33 when the retaining arm 7 is in the retaining position, thereby retaining the lid 21 on the vessel 5. A retaining arm position switch 40 is located adjacent the retaining arm 7, such that the retaining arm 7 actuates the retaining arm position switch 40 when the retaining arm 7 is in the retaining position.

The retaining arm 7 is attached to a side of the hinge 39 facing away from the body 3. On another side of the hinge 39 facing towards the body 3 there is an extension arm 47. The extension arm 47 extends from the hinge 39 in a direction opposite the retaining arm 7. The extension arm 47 is linked to the pivoting of the retaining arm 7 and also pivots about the hinge axis 45, albeit at a phase angle of 180°.

Figure 5:
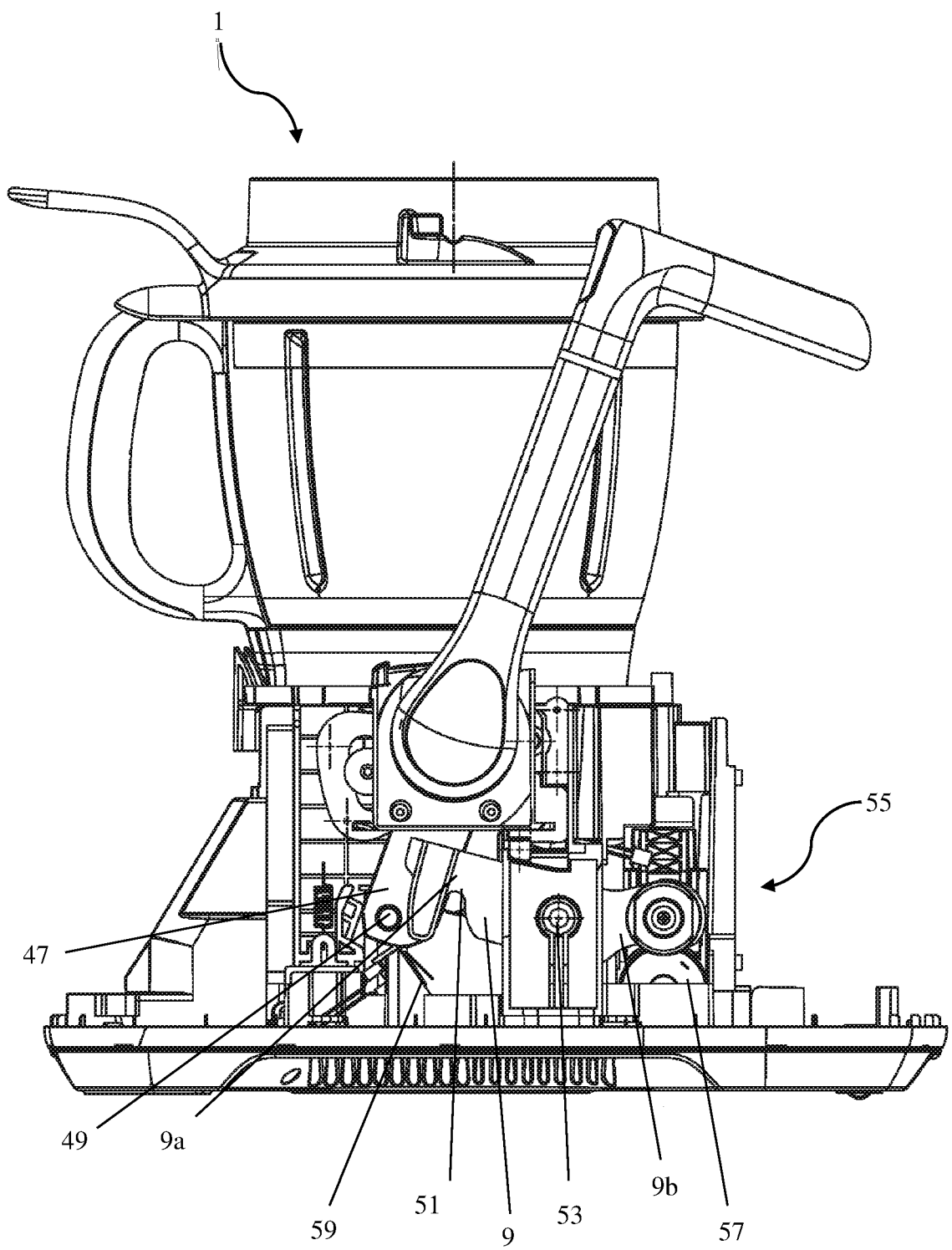
FIG. 5 is a right-side cut-away view of the kitchen device of FIG. 2 with the retaining arm in a free position.

As shown in FIG. 5, a securing pin 49 extends away from the extension arm 47 in a normal direction from the body 3. The securing hook 9 has a recess 51 at a first end 9a. The securing hook 9 pivots about a second hinge 53 between a free position shown in FIG. 1, and a securing position shown in FIG. 2. As shown in FIG. 5, a second end 9b of the securing hook 9 extends beyond the second hinge 53. The second end 9b is connected to a drive mechanism 55 driven by a securing motor 57. A hook position switch 59 is located adjacent the first end 9a of the securing hook 9 such that the securing hook 9 actuates the hook position switch 59 when in the securing position.

Figures 6A, 6B:
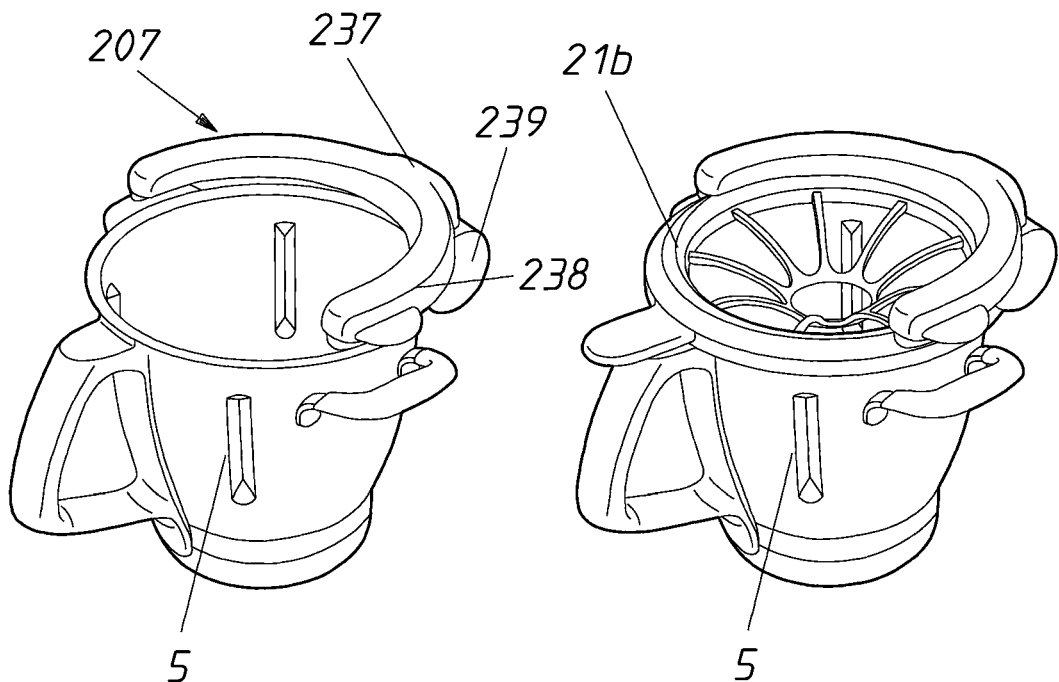
FIG. 6a is a perspective view of a vessel to be used with the kitchen device of FIG. 1.
FIG. 6b is a perspective view of the vessel of FIG. 6a with a first embodiment of a reduction lid placed thereon.
Figures 6C, 6D:
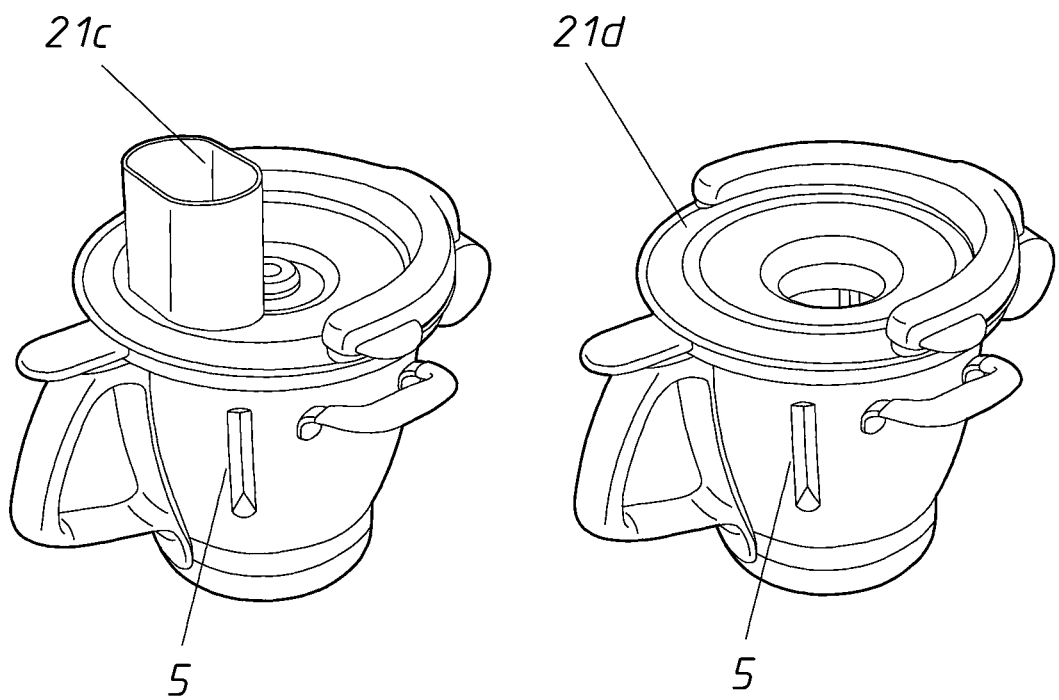
FIG. 6c is a perspective view of the vessel of FIG. 6a with a food processor lid placed thereon.
FIG. 6d is a perspective view of the vessel of FIG. 6a with a standard lid placed thereon.
Figure 7:
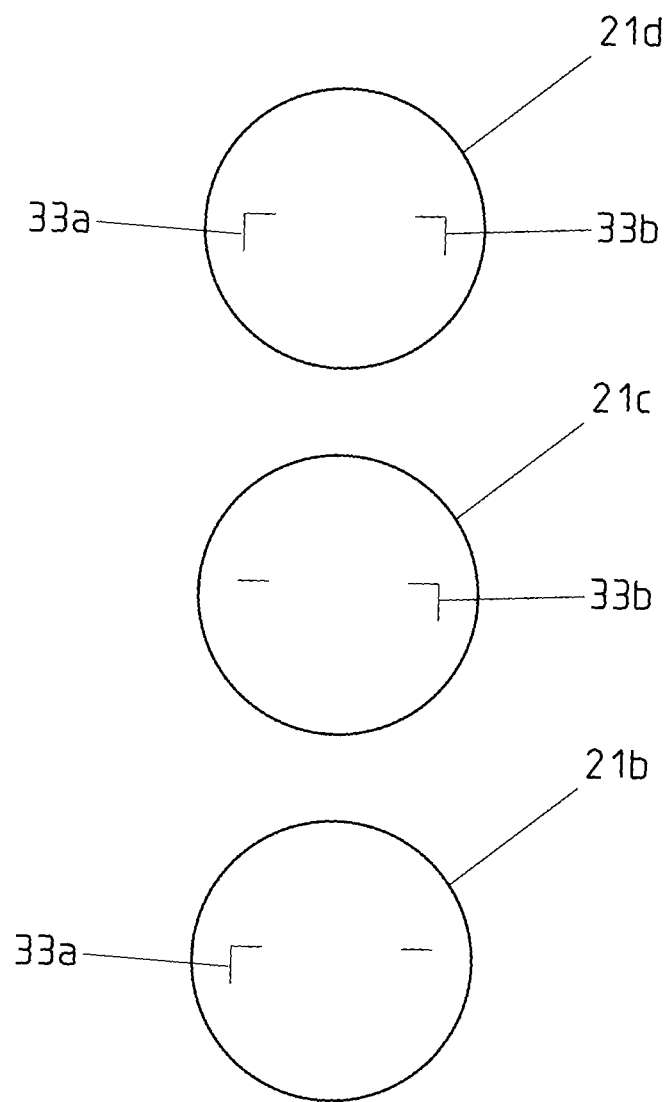
FIG. 7 is a schematic top view of the lids of FIGS. 6b to 6d.

As shown in FIGS. 6a to 6d, multiple configurations of the kitchen device 1 are possible, specifically the lid 21 may take a number of forms. FIG. 6a shows the vessel 5 without a lid 21. FIG. 6b shows the vessel 5 with an embodiment of a reduction lid 21b. FIG. 6c shows the vessel 5 with a food processor lid 21c. FIG. 6d shows the vessel 5 with a standard lid 21d. Referring to FIG. 7, the reduction lid 21b has a first edge 33a of the contact edges 33, while the reduction lid 21b does not have a second edge 33b of the contact edges. The food processor lid 21c has a second edge 33b of the contact edges 33, while the food processor lid 21c does not have the first edge 33a. Finally, the standard lid 21d has both first and second edges 33a, 33b of the contact edges 33.

Figure 8:
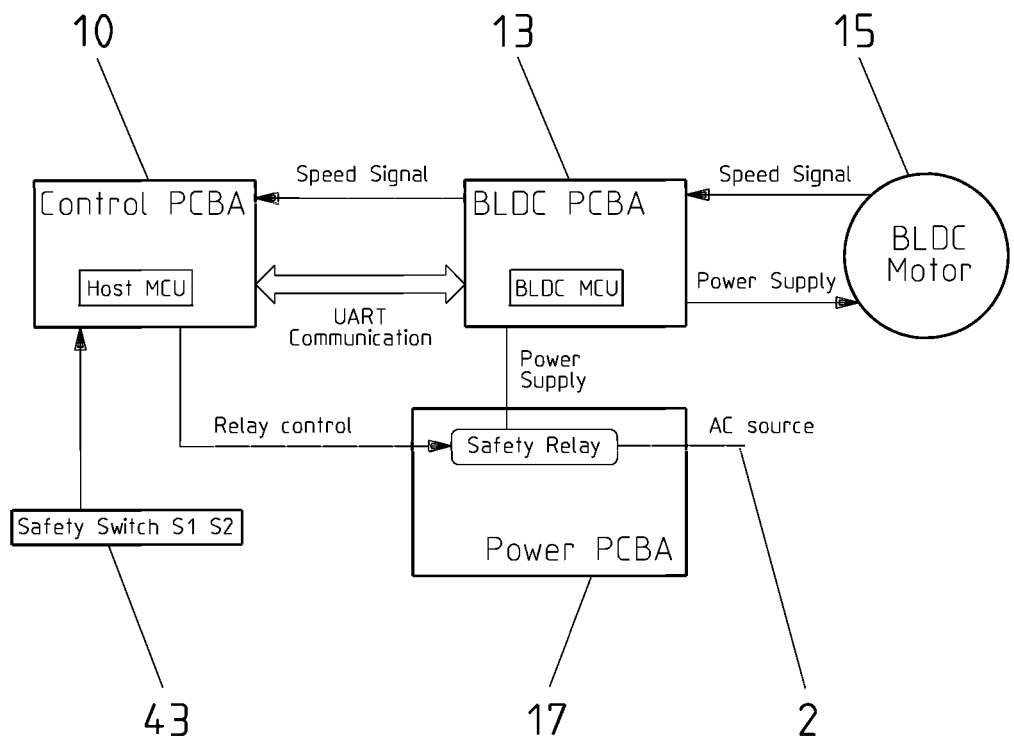
FIG. 8 is a schematic block diagram of an embodiment of the safety system according to the present invention.

As shown in FIGS. 8 and 9, the safety system 4 also has a processor 10 that operates a securing motor controller (not shown) for driving the securing motor 57. The processor 10 also operates a main motor controller 13 for driving the main motor 15. A speed of the main motor 15 is monitored using a motor speed sensor (not shown) that sends a speed signal indicating a motor speed to the processor 10. The safety system 4 further includes a safety relay 17 that responds to instructions from the processor 10 and can interrupt a power supply to the main motor 15.

The processor 10 also communicates with the retaining arm position switch 40, the lid detection switch 43, and the hook position switch 59 to determine whether the switches 40, 43, 59 have been actuated. Specifically, the lid detection switch 43 is actuated when the contact edge 33 makes contact with the lid detection switch 43 inside the channel 41. Actuation of the lid detection switch 43 provides a signal to the processor 10 indicating the presence of the lid 21.

Figure 12:
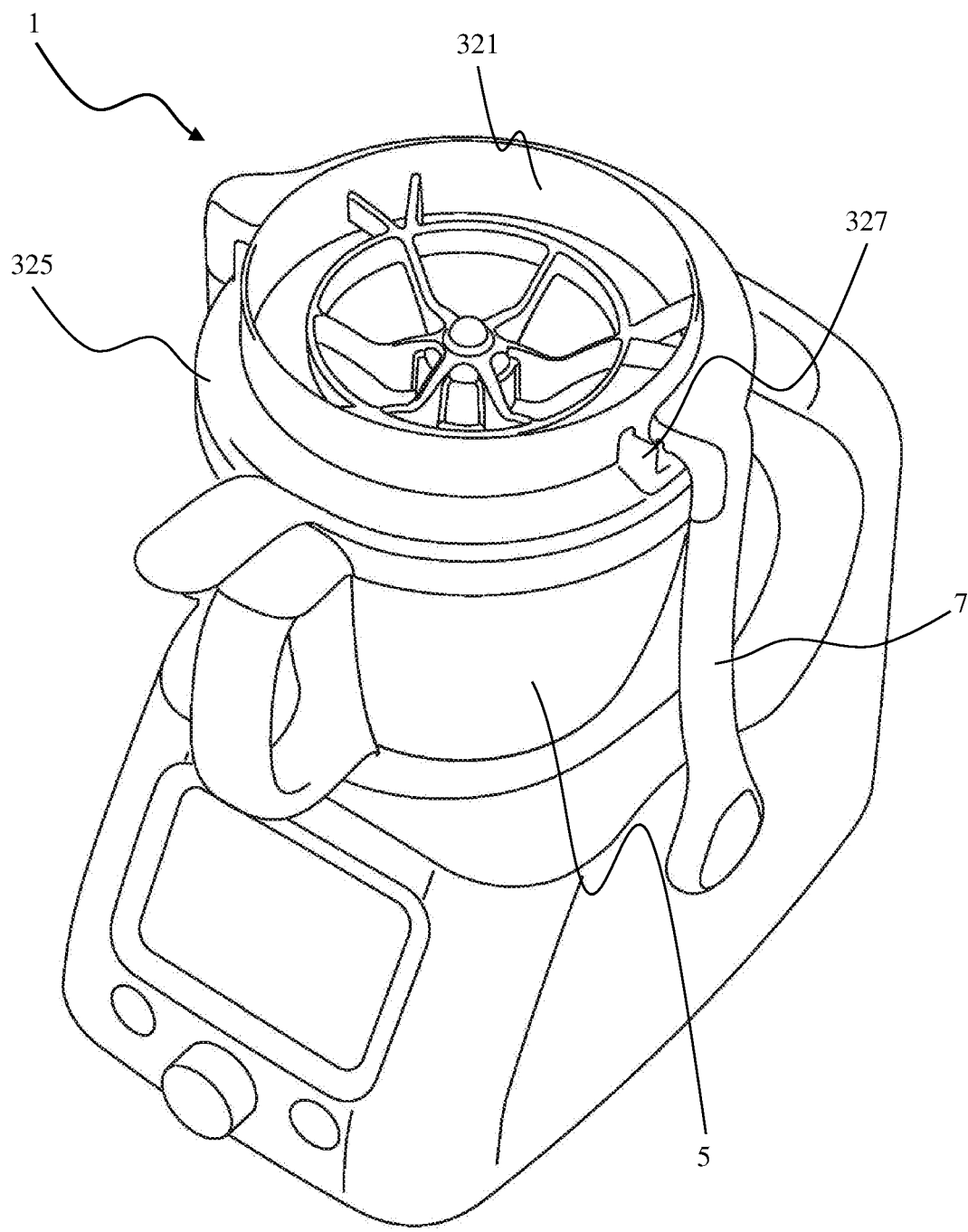
FIG. 12 is a perspective view of the kitchen device of FIG. 1 with a second embodiment of the reduction lid placed thereon.
Figure 13:
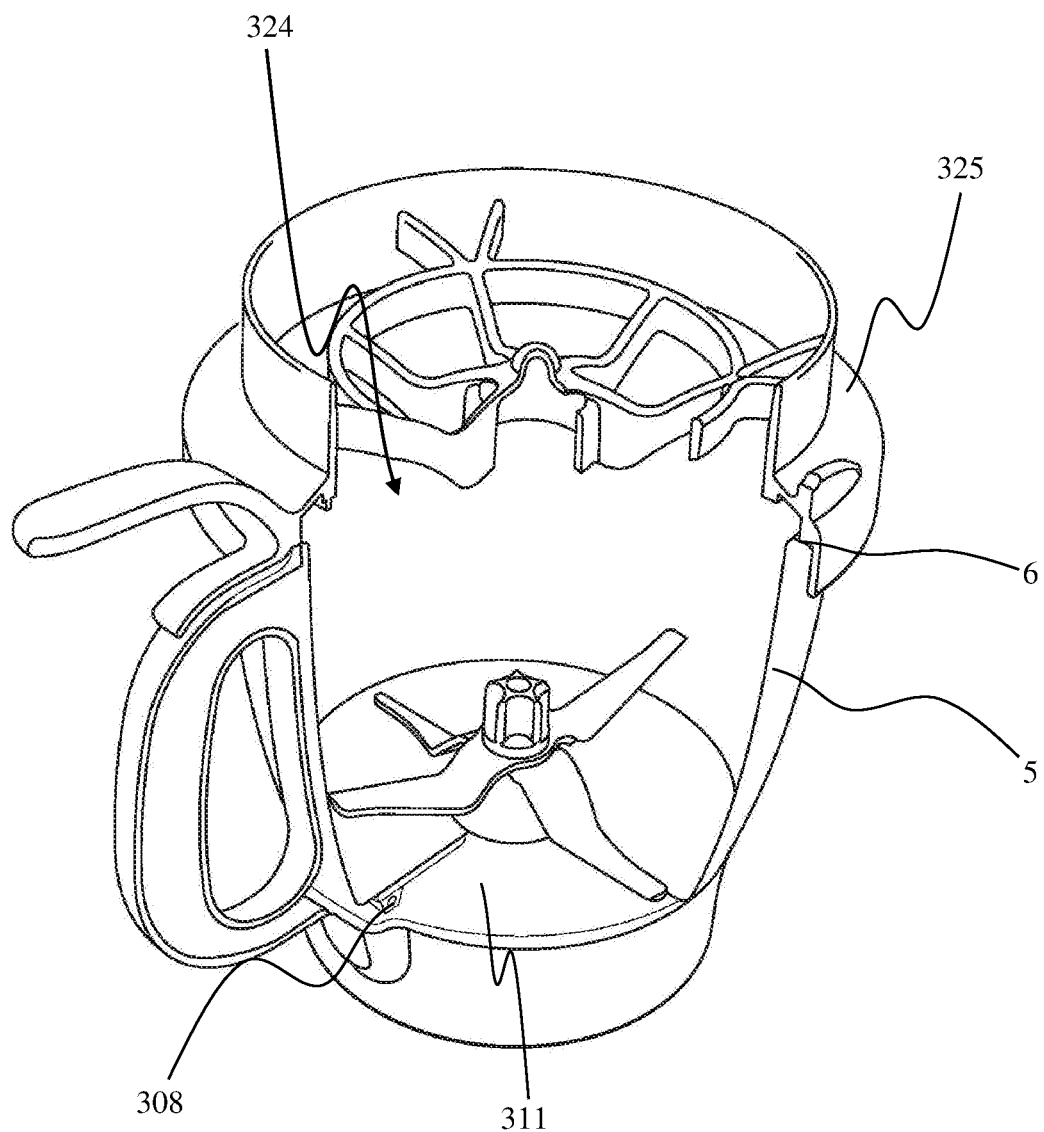
FIG. 13 is a cut-away perspective view of the kitchen device of FIG. 12.
Figure 14:
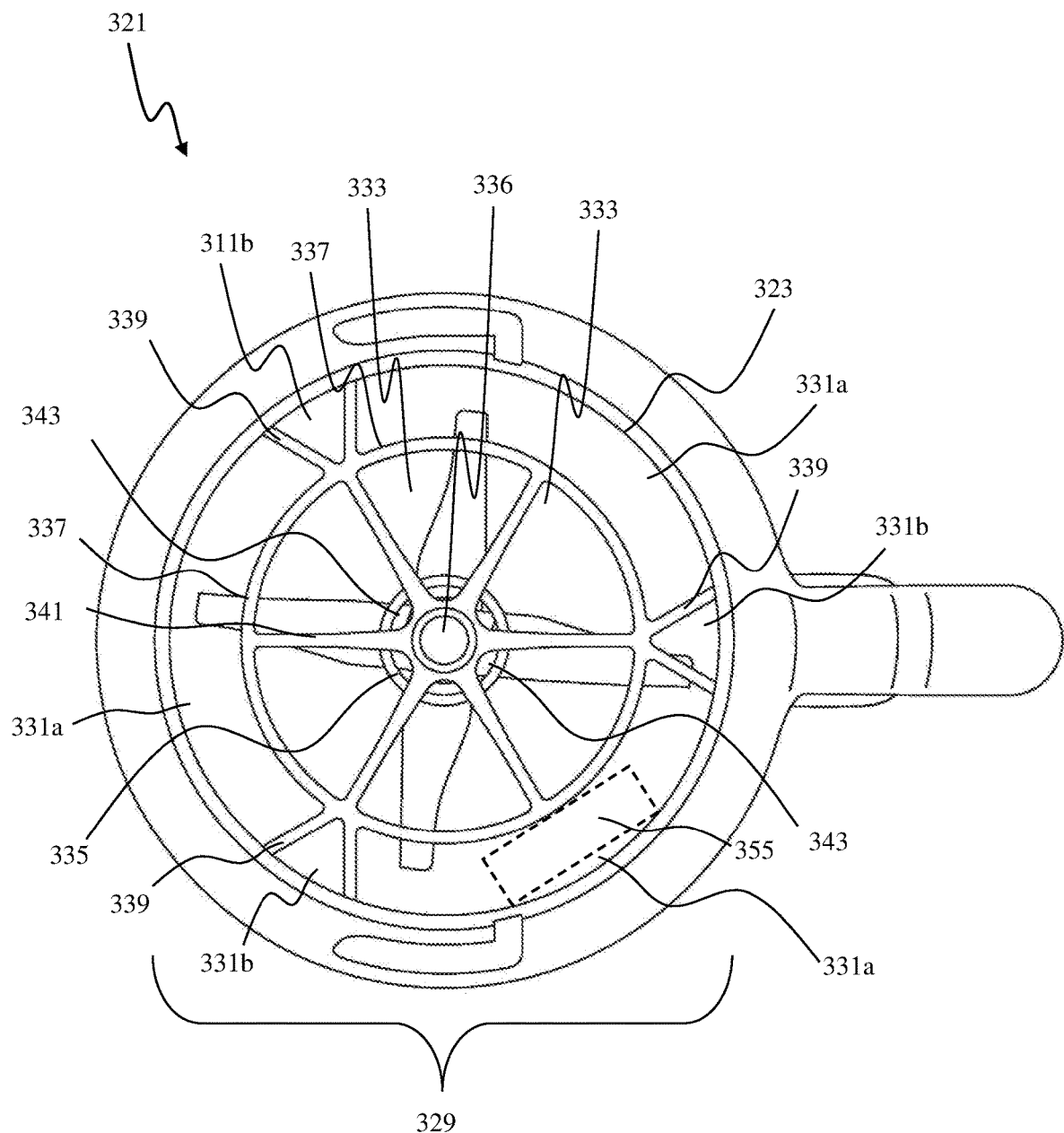
FIG. 14 is a detailed top plan view of the kitchen device of FIG. 12.

As shown in FIG. 12, the kitchen device 1 may further include a lid 321 according to a second embodiment of the reduction lid 21b. The lid 321, similarly to the lid 21, as seen in FIG. 14, has a rim 323 surrounding an opening 324, and an upper surface 325 extending beyond the rim 6 of the vessel 5, as shown in FIG. 13. On the upper surface 325 there are located two projections 327 substantially similar to projections 27. The retaining arm 7, when the retaining arm 7 is in the retaining position, retains the lid 321 on the vessel 5. As shown in FIG. 13, a blade 304 is located in the vessel 5, to be driven by the main motor 15 to process food. Yet further, a heater element 308 is mounted to a floor 311 of the vessel 5 so that it is in thermal communication with the contents of the vessel 5. The heater element 308 is operable by the processor 10.

As shown in FIG. 14, the lid 321 includes a generally structure 329, the structure includes a set of outer apertures, being a set of six outer apertures 331 shown in FIG. 14, a set of inner apertures 333, being a set of six inner apertures 333 shown in FIG. 14, and a central hub 335. The central hub 335 extends from a center point 336 of the lid 321 to a radius of 55 mm.

The set of outer apertures 331 includes a subset of larger outer apertures 331a and a subset of smaller outer apertures 331b. The outer apertures 331 are separated from the inner apertures 333 by an intermediate member 337. The intermediate member 337 is located at a radial distance of 120 mm from the center point 336.

Figure 19:
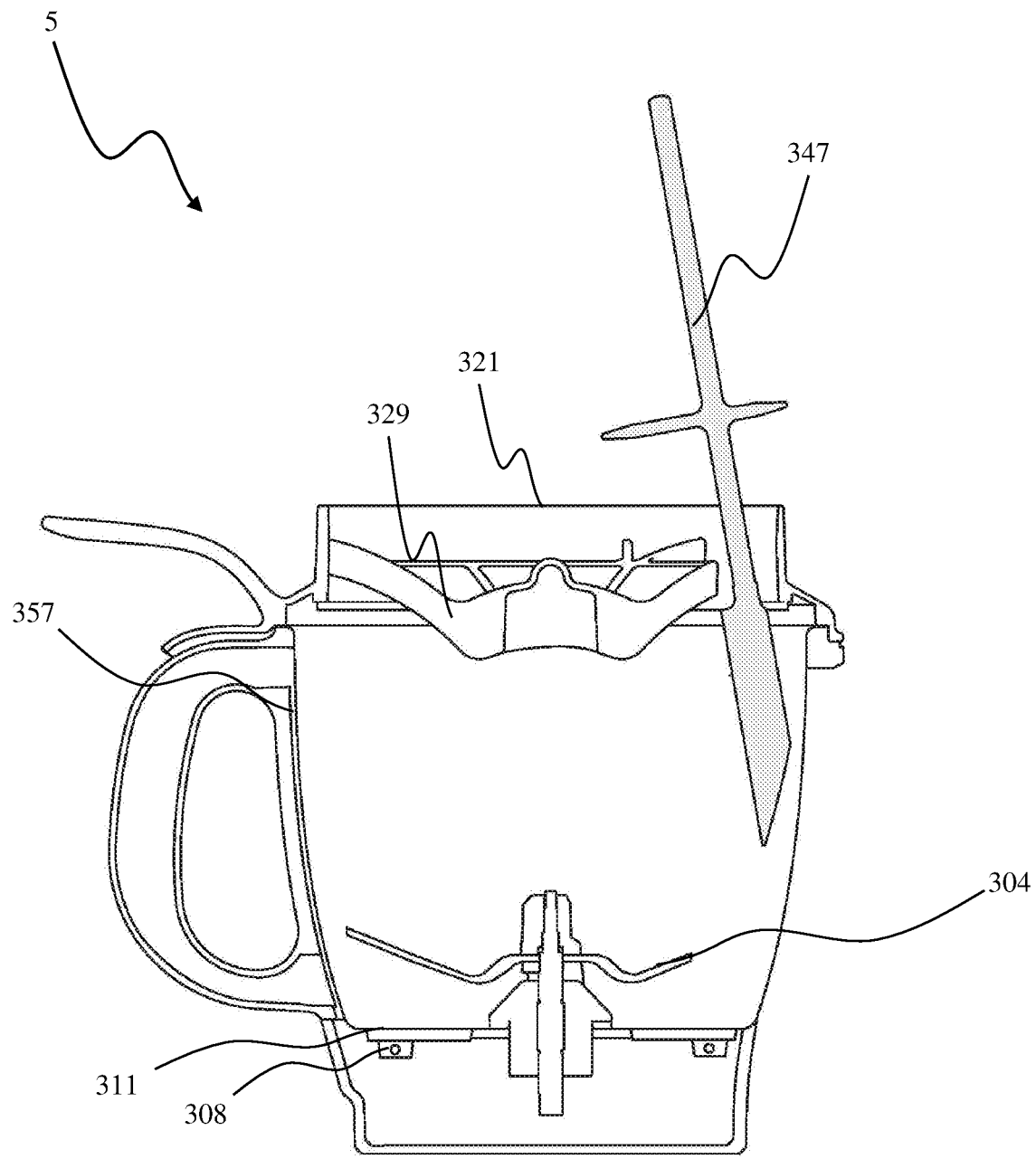
FIG. 19 is a detailed cut-away side view of the kitchen device of FIG. 12 in use.

The intermediate member 337 is connected to the rim 323 by a set of outer connectors, being six outer connectors 339 shown in the embodiment of FIG. 14. The six outer connectors 339 are preferably arranged in pairs, each pair preferably located 120° apart from the other, and separate the outer apertures 331 from one another such that each outer aperture 331 extends for at least 100° adjacent the rim 323, or about 25% of a perimeter of the rim 323 to allow access of a scraper 347, as shown in FIG. 19, through the lid 321 to the upwardly extending sidewalls 357 of the vessel 5. In alternative embodiments, the outer aperture 331 may extend for as little as 10% of the rim 323. The outer apertures 331 meet the rim 323 at a radial distance of 170 mm from the center point 336. The central hub 335 is connected to the intermediate member 337 by a set of inner connectors, being six, preferably equally spaced, inner connectors 341 shown in FIG. 14. The inner connectors 341 separate the inner apertures 333 from one another. The central hub 335 includes a set of hub apertures, being a set of six, preferably equally spaced, hub apertures 343.

Figure 18:
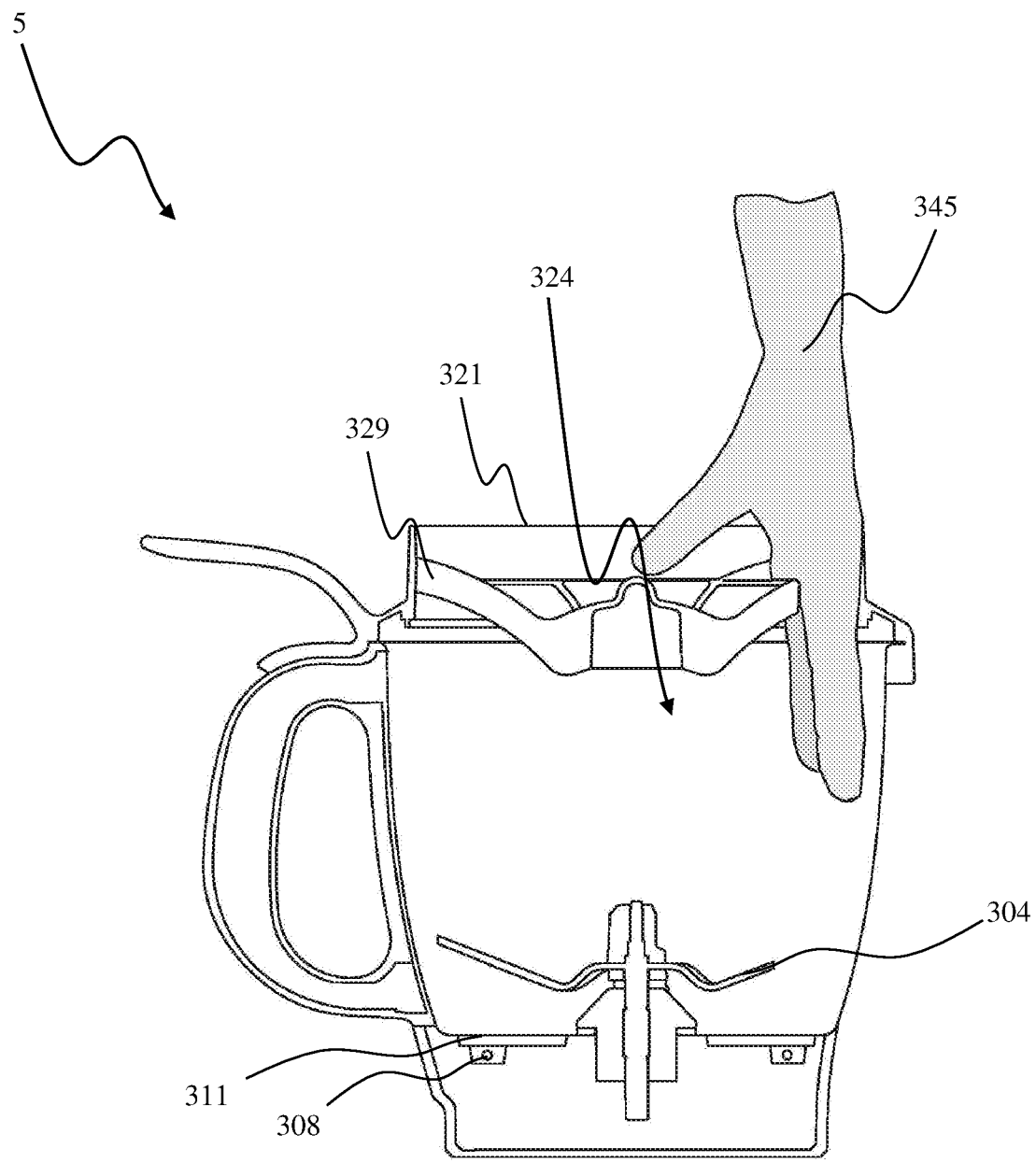
FIG. 18 is a detailed cut-away side view of the kitchen device of FIG. 12 in use.

The outer apertures 331, inner apertures 333, and hub apertures 343 together form an unobstructed space $S^1$. As shown in FIG. 14, a continuous rectangle 355 may be defined in the unobstructed space $S^1$ such that the area within the continuous rectangle 355 is entirely filled with at least a portion of the unobstructed space $S^1$. The structure 329 is dimensioned, as explained above, such that a continuous rectangle 355 having dimensions equal to or larger than 78 mm×25.4 mm in the plane of the unobstructed space $S^1$ cannot be validly defined, as per the process explained above, in the unobstructed space $S^1$. Thereby, as shown in FIG. 18, access of a hand 345 of an operator through the opening 324 is hindered.

Further embodiments of the lid 321 for the kitchen device 1 will now be described, wherein similar features fulfilling similar functions are numbered in centennial increments.

Figure 15:
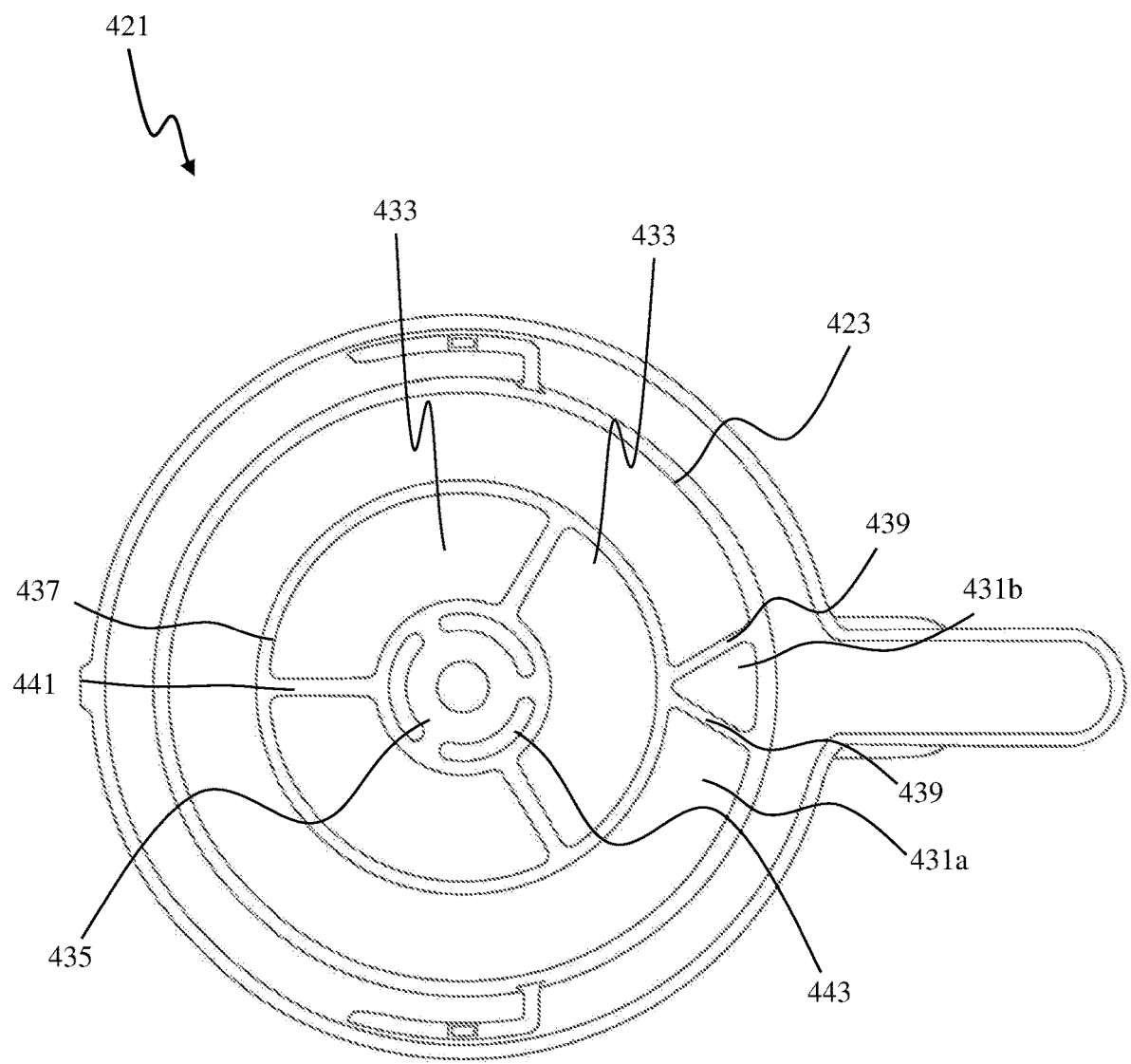
FIG. 15 is a detailed top plan view of the kitchen device of FIG. 1 with a third embodiment of the reduction lid placed thereon.

FIG. 15 shows a further embodiment of a lid 421 for the kitchen device 1. In this embodiment the lid 421 has a set of two outer connectors 439 grouped at a single location, thereby separating a single smaller outer aperture 431*b* from a single larger outer aperture 431*a*. Thereby, the single larger outer aperture 431*a* extends for at least 350° adjacent the rim 423, or about 95% of a perimeter of the rim 423. The two outer connectors 439 support an intermediate member 437, which is connected to a central hub 435 by a set of three equally spaced inner connectors 441, thereby forming a set of three inner apertures 433. Similarly, in this embodiment, the central hub 435 has a set of three hub apertures 443. The outer apertures 431, inner apertures 433, and hub apertures 443 together form the unobstructed space $S^1$. The structure 429 is dimensioned such that a continuous rectangle 355, similarly to FIG. 14, having dimensions equal to or larger than 78 mm×25.4 mm in the plane of the unobstructed space $S^1$ cannot be validly defined, as per the process explained above, in the unobstructed space $S^1$.

Figure 16:
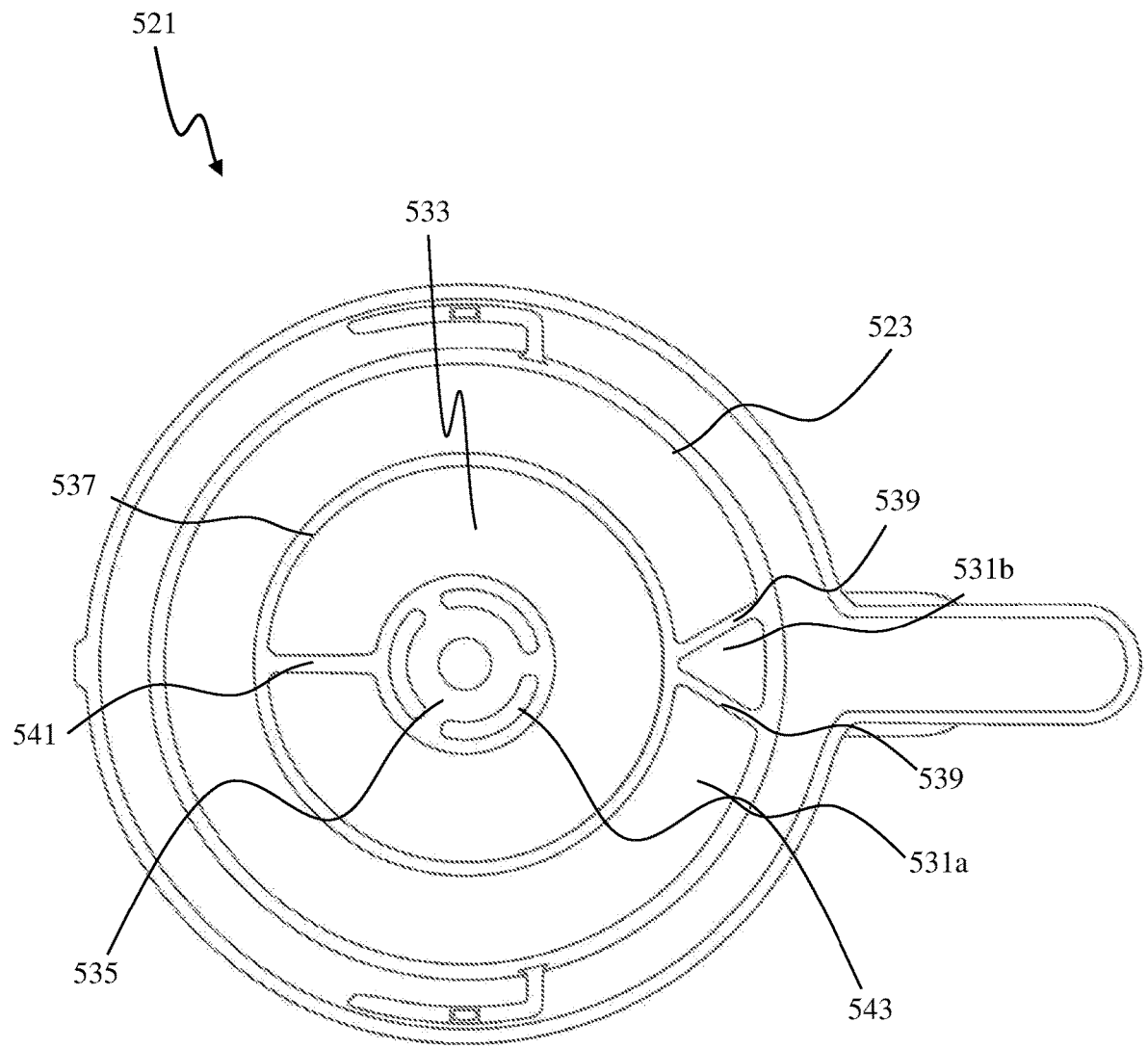
FIG. 16 is a detailed top plan view of the kitchen device of FIG. 1 with a fourth embodiment of the reduction lid placed thereon.

FIG. 16 shows a further embodiment of a lid 521 for the kitchen device 1. In this embodiment the lid 521 has a set of two outer connectors 539 separating a single smaller outer aperture 531*b* from a single larger outer aperture 531*a*. The two outer connectors 539 support an intermediate member 537, which is connected to a central hub 535 by a single inner connector 541, thereby forming a single inner aperture 533. Preferably, the inner connector 541 is located radially opposite the smaller outer aperture 531*b*. Similarly, in this embodiment, the central hub 535 has a set of three hub apertures 543. The outer apertures 531, inner aperture 533, and hub apertures 543 together form the unobstructed space $S^1$. When the central hub 535, the intermediate member 537, and the rim 523 are dimensioned as specified above, the unobstructed space $S^1$ is at least 20% of the opening for a vessel 5 having a rim 6 with a diameter of 205 mm. However, the unobstructed space $S^1$ is more preferably more than 40%, even more preferably more than 60%, and, as shown in the embodiment of FIG. 16, especially preferably more than 80% of the opening for a vessel 5 having a rim 6 with a diameter of 205 mm. The structure 529 is dimensioned such that a continuous rectangle 355, similarly to FIG. 14, having dimensions equal to or larger than 78 mm×25.4 mm in the plane of the unobstructed space $S^1$ cannot be validly defined, as per the process explained above, in the unobstructed space $S^1$.

Figure 17:
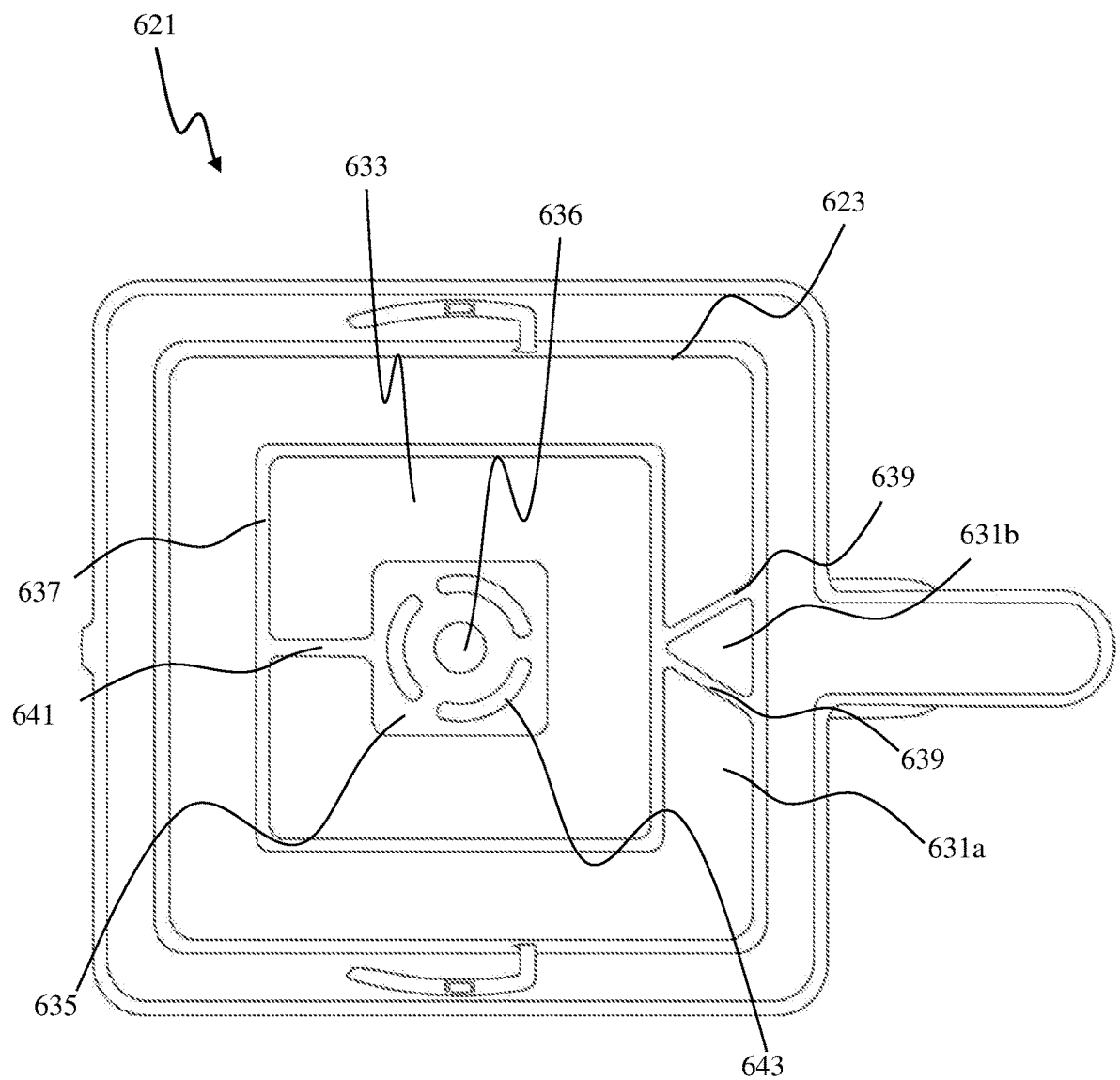
FIG. 17 is a detailed top plan view of the kitchen device of FIG. 1 with a fifth embodiment of the reduction lid placed thereon.

FIG. 17 shows a further embodiment of a lid 621 for the kitchen device 1. In this embodiment the lid 621 is intended for a non-circular vessel (not shown) and has a generally rectangular, or more preferably square, shape. The lid 621 has a set of two outer connectors 639 grouped at a single location thus separating a single smaller outer aperture 631*b* from a single larger outer aperture 631*a*. The single larger outer aperture 631*a* extends adjacent the rim 623 for about 95% of a perimeter of the rim 623. The two outer connectors 639 support an intermediate member 637, which is connected to a central hub 635 by a single inner connector 641, thereby forming a single inner aperture 633. The central hub 635 has a side length of 55 mm and includes a center point 636. The intermediate member 637 is a rectangular, or more preferably square, member having a side length of 120 mm. The lid 621 has a rim 623 that is substantially rectangularly, or square, shaped, the rim 623 having a side length of 170 mm. Similarly, in this embodiment, the central hub 635 has a set of three hub apertures 643. The outer apertures 631, inner aperture 633, and hub apertures 643 together form the unobstructed space $S^1$. The structure 629 is dimensioned such that a continuous rectangle 355, similarly to FIG. 14, having dimensions equal to or larger than 78 mm×25.4 mm in the plane of the unobstructed space $S^1$ cannot be validly defined, as per the process explained above, in the unobstructed space $S^1$.

A person skilled in the art would appreciate that the individual elements of the embodiments of FIGS. 14 to 17 may be combined or altered, for example the structure 329 of FIG. 14 could be embodied in a generally rectangular shape, similar to the lid 621 of FIG. 17.

Use of the kitchen device 1 will now be discussed.

Figure 10:
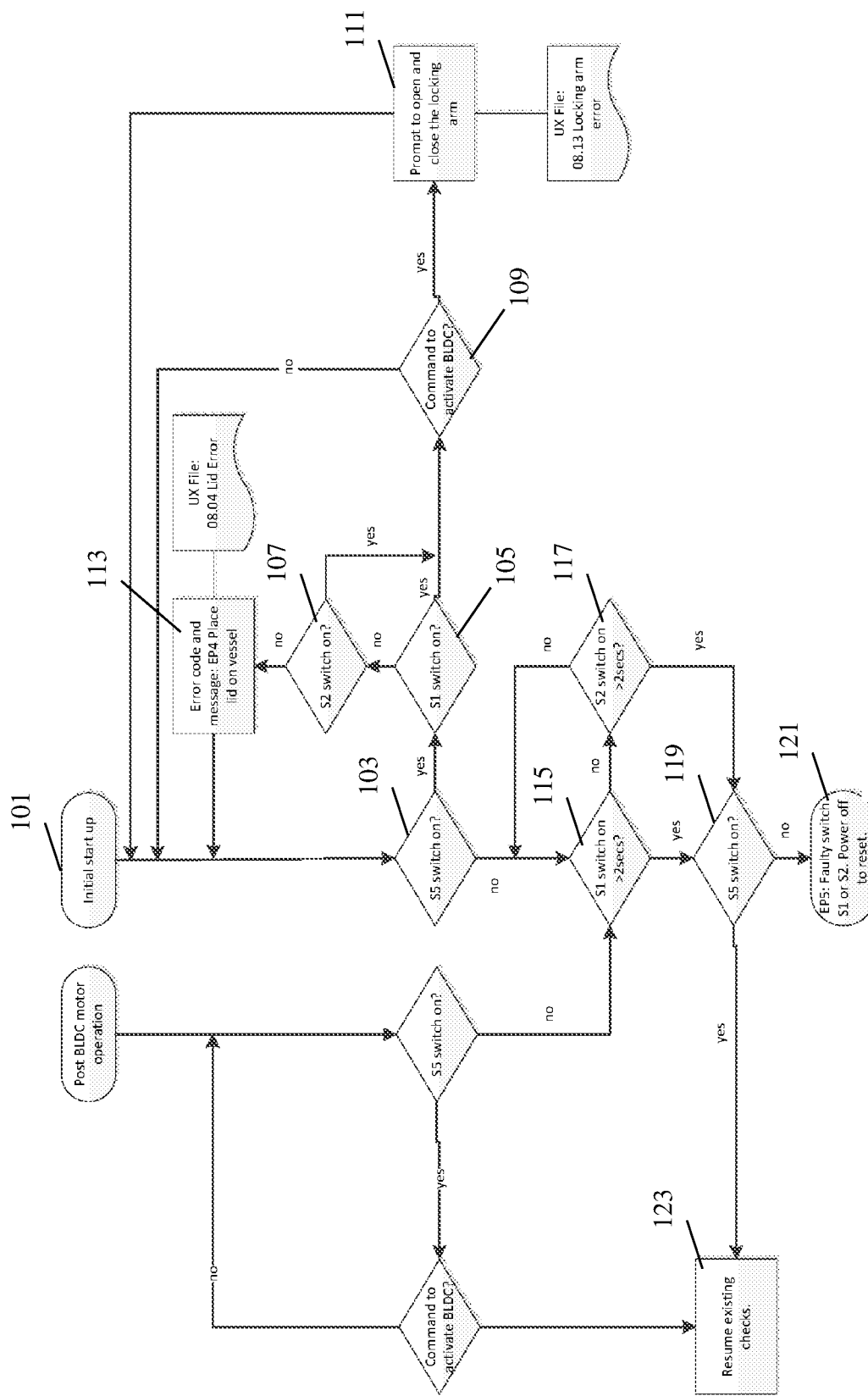
FIG. 10 is a schematic flowchart of the safety system of FIG. 8.

As shown in FIG. 10, upon actuation of the power switch 2, step 101, the processor 10 determines, at step 103, whether the retaining arm 7 is in the retaining position by determining whether the retaining arm position switch 40 is actuated. The processor 10 then determines, at steps 105, 107, whether either of the lid detection switches 43 are actuated. If this is the case and a user has demanded, at step 109, operation of the main motor 15, the processor 10 issues a prompt, at step 111, to move the retaining arm 7 to the free position. If neither of the lid detection switches 43 are actuated, the processor 10 determines, at step 113, that no lid 21 is present on the vessel 5 and prevents power supply to the main motor 15.

If the retaining arm 7 is not in the retaining position, either because the power switch 2 was actuated when the retaining arm 7 is in the free position, or because the processor 10 issued a prompt for the retaining arm 7 to be moved to the free position at step 111, the processor 10 determines, at steps 115, 117 whether either of the lid detection switches 43 are actuated. If either of the lid detection switches 43 is actuated, the processor 10 determines, at step 119, whether the retaining arm 7 is in the retaining position, by polling the retaining arm position switch 40. If the retaining arm position switch 40 is not actuated, this indicates that the lid detection switches 43 are giving a false positive. This could be caused by debris actuating the lid detection switches 43, or by a technical fault in the lid detection switches 43. The processor 10 thus, at step 121, prevents power supply to the main motor 15 and issues a prompt for the user to reset the power switch 2 and/or an error signal indicating a problem with the lid detection switches 43.

If the retaining arm position switch 40 indicates that the retaining arm 7 is in the retaining position, the processor 10, at step 123, determines that the initial safety check has been completed and proceeds with further safety procedures described below.

The processor 10 now uses the securing motor controller to drive the securing motor 57 such that the securing hook 9 descends and engages the pin 49 in the securing position. This secures the retaining arm 7 in a secured retaining position as shown in FIG. 2. In the secured retaining position, the retaining arm 7 is prevented from moving substantially from the retaining position, due to the engagement of the securing hook 9 with the pin 49. The hook position switch 59 is actuated when the securing hook 9 is in the securing position. The processor 10 verifies that the securing hook 9 has moved to the securing position by polling the hook position switch 59. If the securing hook 9 has not moved to the securing position within four seconds of the processor 10 using the securing motor controller to drive the securing motor 57, the processor 10 outputs an error message and reverses a drive direction of the securing motor 57 to return the securing hook 9 to the free position.

Figure 11:
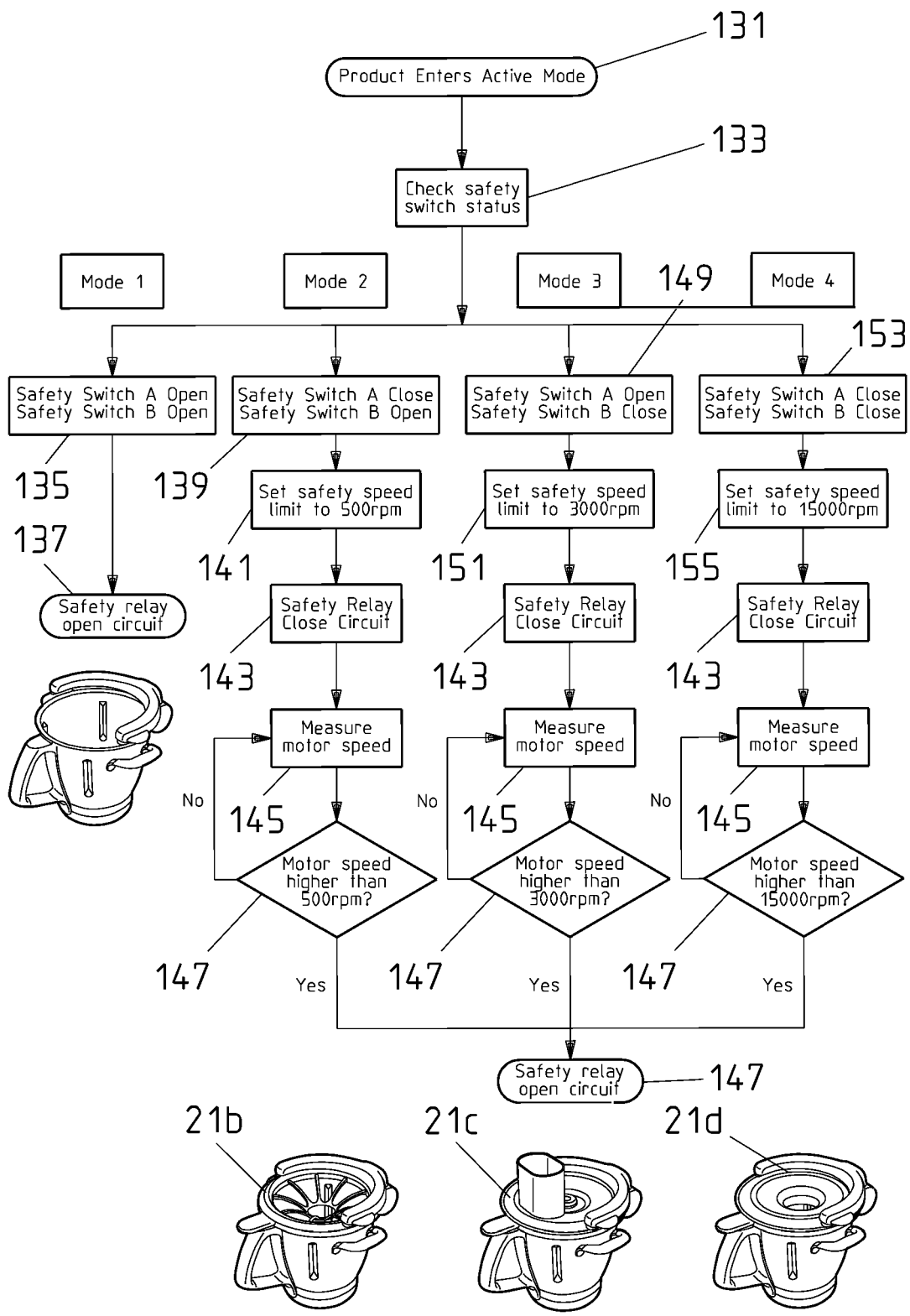
FIG. 11 is a further schematic flowchart of the safety system of FIG. 9.

As shown in FIG. 11, the processor 10 now selects the operating mode of the kitchen device 1. Step 131 is substantially equivalent to step 101, i.e. the power switch 2 is actuated. Step 133 comprises the safety procedure of steps 103 to 123. The processor 10 now selects, at steps 135, 137, 139, 141, the operating mode of the kitchen device 1.

At step 135 the processor 10 determines whether both lid detection switches 43 are not actuated. If this is the case, it indicates that no lid 21 is positioned on the vessel 5. The processor 10 then disconnects, at step 137, the safety relay 17 to prevent power supply to the main motor 15.

At step 139 the processor 10 determines whether the lid detection switch 43 on the second edge 33*b* is actuated and the lid detection switch 43 on the first edge 33*a* is not actuated. If this is the case, it indicates that the reduction lid 21*b* is present atop the vessel 5. The processor 10 then, at step 141, sets a predetermined safety speed limit of, for example, 500 rpm. At step 143, the processor 10 connects the safety relay 17 to supply power to the main motor 15. At step 145 the motor speed sensor measures the speed of the main motor 15 and communicates the speed signal to the processor 10. At step 147, the processor 10 determines whether the motor speed indicated by the speed signal is higher than the predetermined safety speed limit. If this is the case, the processor at step 137, disconnects the safety relay 17 to prevent power supply to the main motor 15.

At step 149, the processor 10 determines whether the lid detection switch 43 on the first edge 33*a* is actuated and the lid detection switch 43 on the second edge 33*b* is not actuated. If this is the case, it indicates that the food processor lid 21*c* is present atop the vessel 5. The processor 10 then, at step 151, sets a predetermined safety speed limit of, for example, 3000 rpm. Similarly to the process described above, step 143 follows to supply power to the main motor 15, and in steps 145, 147 the processor 10 monitors the speed of the main motor 15. If necessary, that is when the motor speed is higher than the predetermined safety speed limit, the processor 10, at step 137, disconnects the safety relay 17 to prevent power supply to the main motor 15.

At step 153, the processor 10 determines whether both lid detection switches 43 are actuated. If this is the case, it indicates that the standard lid 21*d* is present atop the vessel 5. The processor 10 then, at step 155, sets a predetermined safety speed limit of, for example, 15000 rpm. Similarly to the process described above, step 143 follows to supply power to the main motor 15, and in steps 145, 147 the processor 10 monitors the speed of the main motor 15. If necessary, that is when the motor speed is higher than the predetermined safety speed limit, the processor 10, at step 137, opens the safety relay 17 to prevent power supply to the main motor 15.

The lids 321, 421, 521, 621 are used in substantially the same way as the reduction lid 21*b*. The unobstructed space $S^1$ allows evaporation of water, and thus permits reduction of foods contained in the vessel 5.

Advantages of the kitchen device 1 will now be discussed.

The kitchen device 1, using the safety system 4, is able to discern between lids 21 that are able to safely contain hot ingredients being blended or mixed at high velocities, and lids 21 that require a limitation on the motor speed to prevent hot ingredients from causing injuries or damage. This ability allows the use of partially, or completely, open lids 21 enabling cooking operations such as reducing sauces, frying meats, or safely using a food processor (not shown) in the vessel 5.

The use of a separate safety relay 17, rather than performing the control of the motor speed when it is above the predetermined safety speed limit, ensures that the reduction, or complete shut off, of power supply to the main motor 15 is reliable and immediate. Performing this control through the main motor controller 13 could be subject to faults in the software or hardware of the more complex main motor controller 13.

The position switches 40, 43, 59 allow the processor 10 to precisely, and deterministically, check whether the safety system 4, for example the retaining arm 7, the securing hook 9, and the lid 21, are in their respective positions for safe operation.

The securing hook 9 ensures, in the securing position, that the retaining arm 7 remains substantially in the secured retaining position. While it may be possible that the retaining arm 7 moves from the secured retaining position to some degree, the securing hook ensures that the retaining arm 7 is not accidentally removed from the lid 21, causing an interruption to the cooking process, or a safety hazard. This arrangement also provides peace of mind to the user, that the retaining arm 7 is secured in the secured retaining position and the hot ingredients are safely contained in the vessel 5.

The retaining arm 7 contacts the lid 21 on at least two contact areas, being channels 41. The retaining arm 7 thereby retains the lid 21 safely against the vessel 5 in multiple degrees of freedom.

By determining after providing power to the kitchen device 1, at steps 103, 105, 107, 109, whether the retaining arm 7 is in the locking position and engaged with the lid 21, and thereafter prompting the user to move the retaining arm 7 to the free position, the processor 10 ensures that the lid detection switches 43 are tested for correct functionality before power is supplied to the main motor 15. The processor 10 performs that test at steps 115, 117, 119, 121. If the lid detection switches 43 are not functioning appropriately, the processor 10 issues a prompt to clean the lid detection switches 43, or contacting a suitable service provider. This ensures that on every start-up of the kitchen device 1, the lid detection switches 43 are functioning correctly, increasing the safety of the kitchen device 1.

Similarly, the processor 10 determines, at steps 103, 105, 107, 113, whether a lid 21 is present at all on the vessel 5.

The choice of which combination of lid detection switch 43 causes which operating mode to be selected by the processor 10 also increases safety of the kitchen device 1. Since the receipt of no function signal from the lid detection switches 43 causes the safety relay 17 to be disconnected, a fault in the circuitry of the lid detection switches 43 reverts the kitchen device 1 to a default, safe, non-operational state.

The lid 321, as well as the further lid embodiments 421, 521, 621, prevents access of a user's hand to the blade 308 during operation of the kitchen device 1, as shown in FIG. 18. Thus, safe operation of the kitchen device 1 can be ensured, while ensuring the unobstructed space $S^1$ is as large as possible to facilitate the reduction operation.

The lid 321, 421, 521, 621 also provides desirable access to a sidewall of the vessel 5, by ensuring that the outer apertures 333, 433, 533, 633 are continuous for large portions of the perimeter of the rim 323, 423, 523, 623, so that, for example, a scraper may easily be moved continuously along the sidewall of the vessel 5, without hitting one of the outer connectors.

Although the invention has been described with reference to specific examples, it will be appreciated by those skilled in the art that the invention may be embodied in many other forms.

For example, FIGS. 6a to 6d show an embodiment of the retaining arm 207, where the retaining arm 207 has a rounded member 238 and a second rounded member 237 that is pivotable about a hinge 239.

The invention claimed is:

1. A safety system for a kitchen device having a vessel and a lid, the safety system comprising:
   a processor;
   a retaining arm being pivotable about a first axis between a first free position and a retaining position, the retaining arm being adapted to, in the retaining position, retain the lid against the vessel;
   a first sensor adapted to communicate a retaining signal to the processor when the retaining arm is in the retaining position;
   a second sensor adapted to communicate a function signal to the processor, the function signal indicating a function of the lid; and
   a securing hook, the securing hook being pivotable about a second axis between a second free position and a securing position, wherein, in the securing position, the securing hook secures the retaining arm in a secured retaining position to prevent the retaining arm from moving out of the securing position, and
   a third sensor adapted to communicate a securing signal when the securing hook is in the securing position,
   wherein the processor is adapted to select an operating mode of the kitchen device in response to the retaining signal and the function signal and, the first axis is spaced apart from the second axis.

2. The safety system of claim 1, wherein the operating mode includes a limitation on a speed of a motor of the kitchen device.

3. The safety system of claim 2, wherein the limitation on the speed of the motor is effected by a safety relay disconnecting a power delivery circuit to the motor when a maximum speed is measured by a motor speed sensor.

4. The safety system of claim 1 wherein there are at least two second sensors and the retaining arm is adapted to contact the lid on at least two separate contact areas, each contact area having at least one second sensor.

5. The safety system of claim 4, wherein the function comprises and indication of the type of lid present on the vessel and the type of lid is determined by the processor by determining which, if any, of the second sensors communicate a function signal.

* * * * *